United States Patent [19]

Kinoshita

[11] Patent Number: 5,265,367
[45] Date of Patent: Nov. 30, 1993

[54] OTTER BOARD

[75] Inventor: Hiromi Kinoshita, Shimonoseki, Japan

[73] Assignee: Nichimo Co., Ltd., Tokyo, Japan

[21] Appl. No.: 791,445

[22] Filed: Nov. 13, 1991

[51] Int. Cl.$^5$ .............................................. A01K 73/02
[52] U.S. Cl. .................................. 43/9.7; 43/43.13
[58] Field of Search ............................ 43/9.7, 43.13

[56] References Cited

U.S. PATENT DOCUMENTS 4,894,946  1/1990  Fukushima ........................ 43/9.7

FOREIGN PATENT DOCUMENTS

| 0643948 | 9/1928 | France .............................. 43/9.7 |
| 0035487 | 5/1935 | Netherlands ..................... 43/9.7 |
| 0031528 | 9/1911 | U.S.S.R. ........................... 43/9.7 |
| 0019173 | of 1911 | United Kingdom ............ 43/9.7 |
| 0212265 | 5/1924 | United Kingdom ............ 43/9.7 |

Primary Examiner—Kurt C. Rowan

[57] ABSTRACT

Otter board which is provided with a means for adjusting net-mouth expanding force which can be driven by liftingrope thereby to freely vary said force. According to the first embodiment of the invention, said otter board is formed by biplane construction of board plane-members, and said means for adjusting the net-mouth expanding force comprises the outermost board plane member of said biplane construction that is variable in its angle of attck about a pivot provided in the biplane construction. According to the second embodiment of the invention, said means for adjusting the net-mouth expanding force comprises a through bore in a single otter board construction, said through holehaving a variable opening area by means of an oscillating member.

18 Claims, 2 Drawing Sheets

OTTER BOARD

TECHNICALL FIELDS

This invention related to otter board, particularly those which can freely adjust the net-mouth expanding force of trawl net by adjusting the reeling out length of lifting rope on board.

BACK GROUND OF THE INVENTION

In general, expanding of net-mouth of trawl net is carried out by means of heavy and uniform otter board. More specifically, an otter board is attached to the ends of 2 warps reeled out from the ship, and the otter board is connected to the corresponding wing net on the both sides of trawl net by means of otter-pendants, hand ropes and net pendants. In order to adjust the net-mouth expanding width, it is necessary to vary the angle of attack of said otter board against water thereby to adjust the force of water current applied on said otter board. For this purpose, at every adjustments of net-mouth expanding width, the whole fishing gear is lifted on board to adjust the fixing points of otter board pendants and the like.

However, the prior art method for adjusting the net-mouth expanding width of net-mouth of trawl net has the following disadvantages:

(1) Even when the speed of trawling ship is increased or dicreased for the purpose of varying the net-mouth expanding width, the actual variation obtained of angle of attack against water of said otter board is few with minimum variation of water current force. Therefore, it has been very difficult of obtain the desired variation of said angle of attack and current force, so that it was very difficult to obtain a desired amount of variation of the net-mouth.

(2) When drawing the trawl net while scouting the fish group in the fishing fields, there was no variation of net-mouth expanding width, consequently no variation of resistance of fishing gear, so that sparing of fuel oil was difficult.

(3) It has been necessary to keep the trawl net on board for the purpose of sparing of fuel oil and for vast scouting. Therefore, even when a fish group has been found, the throwing down and setting of trawl fishing gear were so much time consuming that the fish group was lost or was captured by other trawl ships.

(4) The otter board has large shape and weight. Therefore, when it is lifted on board for adjusting its net-mouthexpanding width, its handling has been very difficult and needed so much practice.

It is therefore an object of this invention to provide a net-mouth expanding apparatus wherein it is possible to adjust the net-mouth expanding force on board and the net-mouth expanding width suitably in accordance with the fishing purposes, thereby to decrease the fuel cost with easy handling.

In order to resolve the above problems, the otter board claimed in claim 1 is characterized in that it is provided with a means for adjusting net-mouth expanding force which can be driven by lifting rope thereby to freely vary said force.

The otter board according to the invention claimed in claim 2 is characterized in that it is formed by biplane construction of board plane members, and said means for adjusting the net-mouth expanding force comprises the outermost board plane member of said biplane construction that is variable in its angle of attack.

The otter board according to the invention claimed in claim 3 is characterized in that said means for adjusting the net-mouth expanding for comprises a through bore in said otter board having a variable opening area.

When using the otter board according to the invention claimed in claim 1, the reeling out length of lifting rope is adjusted thereby to drive said means for adjusting said net-mouth expanding force, whereby the net-mouth expanding force of the whole otter board is varied to adjust the net-mouth expanding width of trawl net.

When using the otter board according to the invention claimed in claim 2, the position of said outermost board of said biplane construction is varied, whereby the net-mouth expanding force of the whole otter board is varied to adjust the net-mouth expanding width of trawl net.

When using the otter board according to the invention claimed in claim 3, when the reeling out length of lifting rope is adjusted, said through bore in the otter board as means for adjusting the net-mouth expanding force varies its opening area, whereby the net-mouth expanding force of the whole otter board is varied to adjust the net-mouth expanding width of trawl net.

Since the net-mouth expanding apparatus according to the invention is constructed and operated as above, the net-mouth expanding force can be adjusted on board to adjust the net-mouth expandig width in accordance with the fishing purposes, thereby to decrease the fuel cost with easy handling.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a perspective view of said first embodiment, FIG. 2 is a cross sectional view taken along the line II—II of FIG. 1, and FIG. 3 is a perspective view of trawling state using said otter board according to the invention.

DETAILED DESCRIPTION

Figure 1:
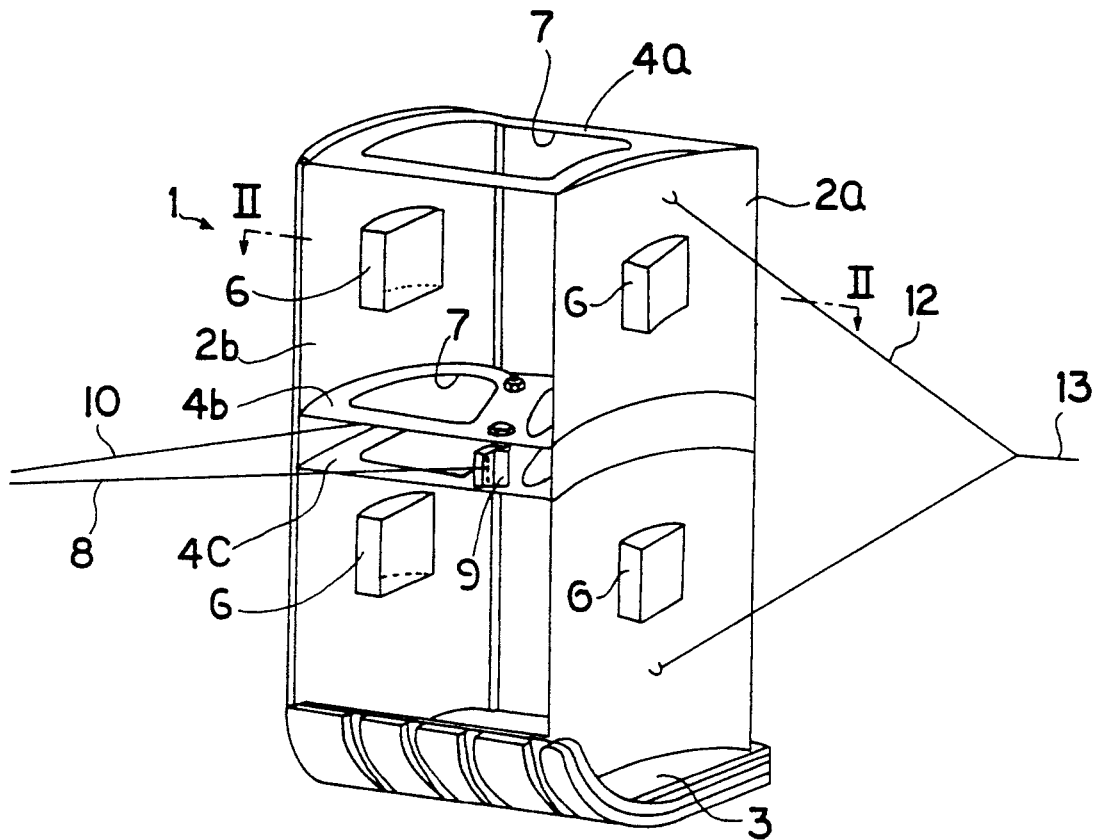
In FIG. 1-3 showing the first embodiment of the otterboard according to the invention.
Figure 2:
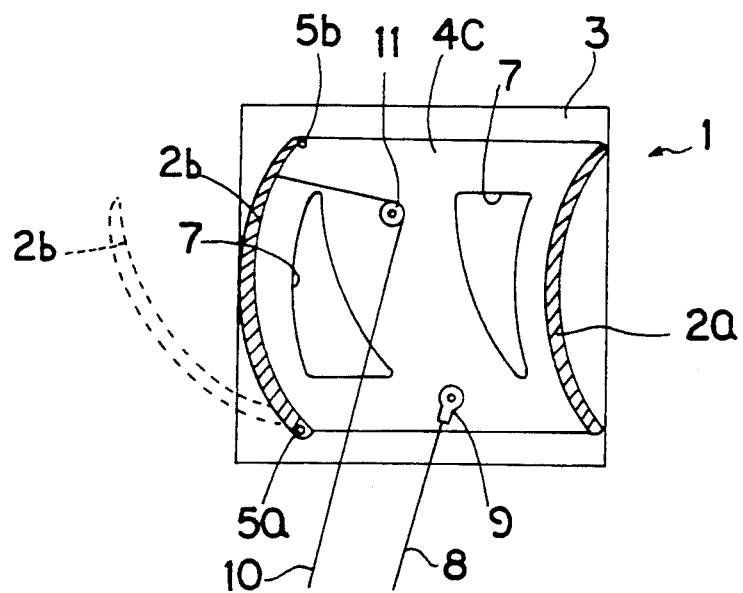
Figure 3:
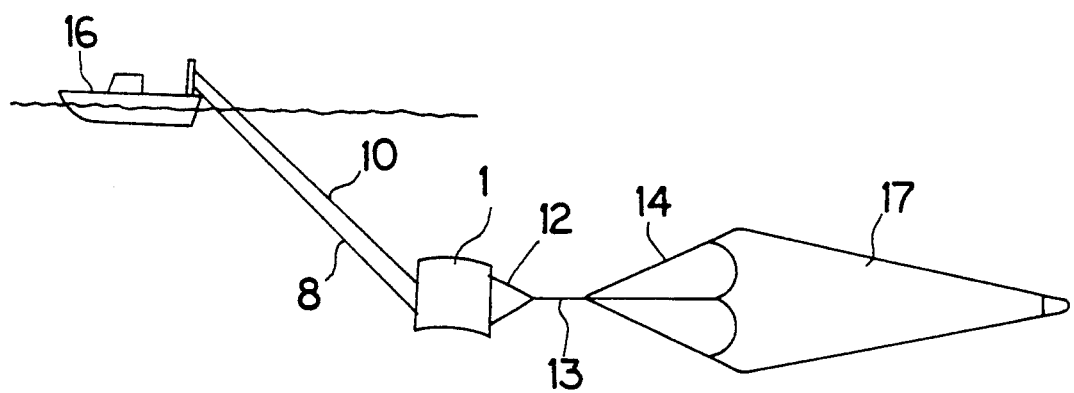

Referring now to FIGS. 1-5, an embodiment according to the invention shown in FIGS. 1-3 is an otter board formed in biplane construction.

The otter board has two board plane members 2a, 2b. Said interior board plane member 2a and two vertical shafts 5a, 5b located at front and rear edges of outer board plane member 2b are connected in approximately parallel relationship with each other by means of a bottom sled 3 and three horizontal connecting members 4a, 4b, 4c. Said outer board plane member 2b is at its front edge rotatable mounted on said front vertical shaft 5a. In this embodiments, the outer board plane member 2b is the means for freely adjusting the net-mouth expanding force. The interior side surfaces of said board plane members 2a, 2b are each concave, and are provided with through holes 6 for leading the inner water current to the outside between the connecting members 4a and 4b and between the connecting member 4c and the sled 3, respectively. Respective through holes 6 are formed by raising portions of corresponding board plane members 2a, 2b on the inner side thereof so as to face the front side. The front portion of said sled 3 is curved upwardly. Respective connecting members 4a, 4b, 4c are provided with through holes 7 of suitable size. A warp 8 reeled out from the ship 8 is connected at its forward end with a warp connecting member 9 which is pivoted at the front edge of the space between two central connecting members 4b, 4c by means of suitable mounting means such as bolt and nut. A lifting rope 10 reeled out from the ship is wound about a pulley 11 mounted rotatably between said two central connecting members 4b, 4c in the same manner as said warp connecting member 9, and is connected at its end to a suitable portion of the inner surface of said outer board plane member 2b. The otter board 1 has connected thereto a trawl net 15 through otter pendant 12, hand rope 13 and net pendant 14 and like.

The operation of the first embodiment is explained hereunder.

When the trawl net 15 is thrown into water from the ship and is drawn by means of warp 8, the adjustment of net-mouth expanding width of trawl net 15 is carried out as follows.

When the outer board plane member 2b is located at the position shown by continuous line in FIG. 2, the net-mouth expanding force of said otter board is the highest. When the lifting rope 10 is further reeled out from this state, the outer board plane member 2b shifts under the water current force up to the position shown by dashed line in FIG. 2 in accordance with the reeling out length of trawl net 15. The position shown by the dashed line is obtained when the lifting rope 10 has been reeled out until the board plane member 2b becomes parallel with water current direction while drawing the trawl net 15, and in this state the net-mouth expanding force of the board plane member 2b becomes nearly zero. Accordingly, according to this embodiment, the net-mouth expanding force can be very simply and freely varied by adjusting the reeling out length of lifting rope 10 on board, from the maximum value obtained when using both board plane members 2a, 2b to the minimum value when using single board plane member 2a. Consequently, the operation to lift the fishing gear to vary its fixing position every time when changing the net-mouth expanding force as in the heretofore known technics is perfectly avoided.

Figure 4:
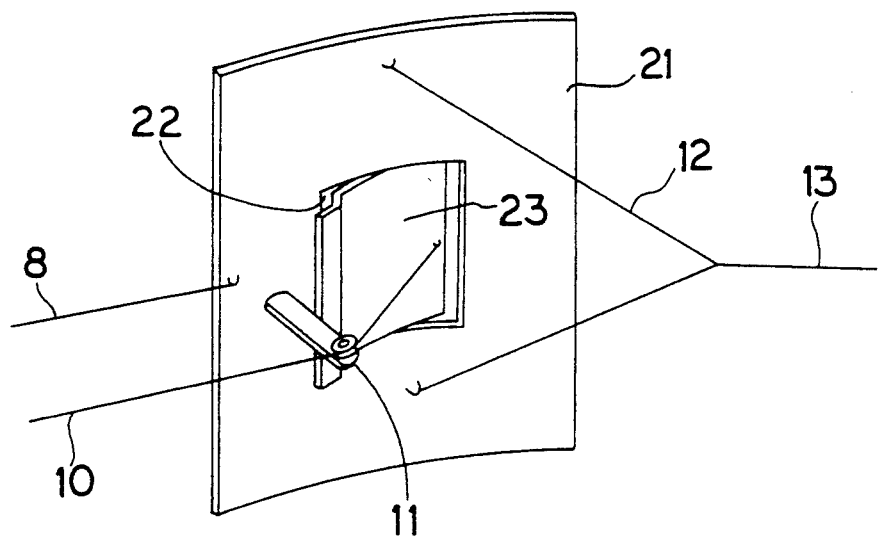
FIG. 4 a perspective view of the second embodiment of the otter board according to the invention.
Figure 5:
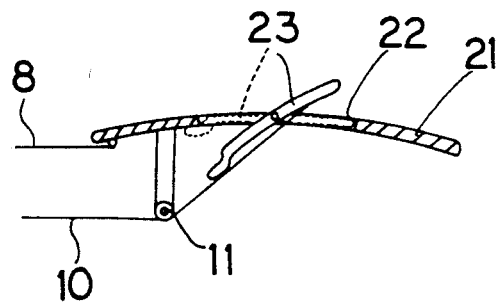
FIG. 5 is a partial cross sectional view of a part of otter board shown in FIG. 4.

The second embodiment of the invention is shown in FIG. 4 and FIG. 5, in which a single board plane member is used.

The otter board 21 in this embodiment is provided with an oscillating member 23 for varying the opening area of through hole 22 as net-mouth expanding adjusting means, said otter board 21 being mounted in said through hole 22 by means of a pivot 24. The lifting rope 10 is first wound about the pulley 11 fixed to the interior surface of otter board 21, and is attached at its end to a suitable portion of said oscillating member 23. Other parts of this otter board 21 have the same construction as that of the first embodiment, so that the like members are shown by the same numerals.

In this second embodiment of otter board, the maximum net-mouth expanding force is obtained when the lifting rope 10 is pulled up to the most extent and the through hole 22 is completely shut down (as shown by dashed line in FIG. 5) by the oscillating means 23. Then, the net-mouth expanding force is gradually decreased when the lifting rope 10 is reeled out so that the oscillating member 23 is gradually opened under the action of water current thereto as shown by continuous line in FIG. 5. Consequently, according to this second embodiment, the net-mouth expanding force can be very simply and freely varied by adjusting the reeling out length of lifting rope 10 on board. Therefore, the operation to lift the fishing gear to vary its fixing position every time when changing the net-mouth expanding force as in the heretofore known technics is perfectly avoided.

Further, the invention is not limited to the above embodiments. For example, more than 3 board plane members can be used in the scope of the invention.

What We claim is:

1. A biplanar otter board towable through the sea for laterally diverting an object towed therefrom, comprising:
    a. a pair of laterally spaced curved generally vertically disposed boards;
    b. means fixedly connected to a first one of said curved boards, for maintaining said boards in spaced disposition respecting one another;
    c. the remaining board being pivotally connected to said space maintaining means and freely rotatable around a vertical axis defined by said pivotal connection between a position at which said boards are generally parallel and a variable position to which said rotatable board moves responsively to force of water thereagainst as said otter board is towed and is limited from further rotation by a restraining line of variable length defining said variable position and connected to a vessel towing said board.

2. The otter board of claim 1 further comprising means, mounted on said connecting means, for spacing said restraining line away from said remaining board as said remaining board rotates.

3. The otter board of claim 2 wherein said pivotal connection is a leading edge when said otter board is towed.

4. The otter board of claim 3 wherein said otter board is towed by a line connected to said otter board at a position closer to said first board than to said remaining board.

5. The otter board of claim 4 wherein said means for spacing said restraining line away from said remaining board is mounted closer to said remaining board than to said first board.

6. An otter board towable through the sea for horizontally diverting an object toward therefrom, comprising:
    a. a pair of curved generally vertically disposed boards having vertically and horizontally extending edges;
    b. a first one of said boards having an aperture therein with edges parallel with said edges of said boards;
    c. said second board being of the shape of said aperture, residing therein and being pivotally connected to said first board for rotation with respect thereto about a vertical axis between a position at which said boards are generally coincident and a variable position to which said rotatable board moves responsively to force of water thereagainst as said otter board is towed and is limited from further rotation by a restraining line of variable length defining said variable position and connected to a vessel towing said board; and d. means connected to said first board and extending laterally therefrom for spacing said restraining line away from said first board as said second board rotates.

7. The otter board of claim 6 wherein said spacing means is connected to said first board on a concave side thereof.

8. The otter board of claim 7 wherein said spacing means connects with said first board along a line substantially at the vertical midpoint of said aperture.

9. The otter board of claim 8 wherein said spacing means is forward of said aperture respecting the direction of tow of said otter board.

10. The otter board of claim 9 wherein said second board is pivotally connected to said first board at substantially the horizontal midpoint of said aperture.

11. The otter board of claim 10 wherein said second board further comprises lip means overlying the forward vertical edge of said aperture respecting the direction of tow when said second board is positioned generally coincident with said first board for limiting rotation of said second board respecting said first board when said restraining line is pulled in the direction of two of said otter boards.

12. The otter board of claim 11 wherein said lip extends substantially the vertical length of said second board.

13. A biplanar otter board towable through the sea for horizontally diverting the object towed therefrom, comprising:
   a. a pair of spaced apart, vertically upstanding curved boards, said boards having substantially common curvature, having respective concave and convex horizontally facing surfaces, having respective vertically and horizontally extending edges and being of substantially the same size;
   b. means fixedly extending from a first one of said curved boards, for maintaining said boards in spaced disposition respecting one another, comprising:
      i. a generally planar horizontal step board fixedly connected to said first one of said curved boards at a vertical extremity thereof and being generally perpendicular thereto;
      ii. a plurality of parallel generally planar members extending from said first one of said curved boards, being generally parallel with and spaced from said step board;
   c. a remaining one of said curved boards being pivotally connected to said space maintaining means along a vertically extending edge of said remaining one of said curved boards and being freely rotatable around a vertical axis defined by said pivotal connection between a position at which said boards are generally parallel and a variable position to which said rotatable board moves responsively to force of water thereagainst as said otter board is towed and is limited from further rotation by a restraining line of variable length defining said variable position and connected to a vessel towing said board;
   d. said step board and said planar members collectively providing means for limiting approach of said remaining one of said pair of boards to said first board of said pair upon rotation of said remaining board about said axis.

14. The otter board of claim 13 wherein one of said boards has apertures therethrough.

15. The otter board of claim 14 further comprising means, mounted on said space maintaining means, for spacing said restraining line away from said remaining board as said remaining board rotates.

16. The otter board of claim 15 wherein said edge at which said pivotal connection is located is a leading edge when said otter board is towed.

17. The otter board of claim 16 wherein said tow line is connected to said connecting means at a position closer to said first board than to said remaining board.

18. The otter board of claim 17 wherein said means for spacing said restraining line away from said remaining board is mounted on said connecting means closer to said remaining board than to said first board.

* * * * *